US012565215B2

(12) United States Patent
Gupta et al.

(10) Patent No.: US 12,565,215 B2
(45) Date of Patent: Mar. 3, 2026

(54) MULTI-POLICY LANE CHANGE ASSISTANCE FOR VEHICLE

(71) Applicant: Atieva, Inc., Newark, CA (US)

(72) Inventors: Pinaki Gupta, Fremont, CA (US); Kshitij Tukaram Kumbar, Fremont, CA (US); Ajeet Ulhas Wankhede, San Jose, CA (US)

(73) Assignee: Atieva, Inc., Newark, CA (US)

( * ) Notice: Subject to any disclaimer, the term of this patent is extended or adjusted under 35 U.S.C. 154(b) by 235 days.

(21) Appl. No.: 18/472,935

(22) Filed: Sep. 22, 2023

(65) Prior Publication Data

US 2024/0116511 A1    Apr. 11, 2024

Related U.S. Application Data

(60) Provisional application No. 63/379,085, filed on Oct. 11, 2022.

(51) Int. Cl.
*B60W 30/18* (2012.01)
*B60W 50/00* (2006.01)
*G08G 1/16* (2006.01)

(52) U.S. Cl.
CPC ...... *B60W 30/18163* (2013.01); *B60W 50/00* (2013.01); *G08G 1/167* (2013.01);
(Continued)

(58) Field of Classification Search
CPC ........... B60W 30/18163; B60W 50/00; B60W 2050/0012; B60W 2552/10;
(Continued)

(56) References Cited

U.S. PATENT DOCUMENTS 11,370,435 B2 *  6/2022  Zhao .................. G01C 21/3469
11,814,072 B2 *  11/2023  Johnson .......... B60W 30/18159
(Continued)

OTHER PUBLICATIONS

Zhang, Lu, et al. "Efficient uncertainty-aware decision-making for automated driving using guided branching." 2020 IEEE International Conference on Robotics and Automation (ICRA). IEEE, 2020. (Year: 2020).*

(Continued)

*Primary Examiner* — Angelina M Shudy
(74) *Attorney, Agent, or Firm* — Brake Hughes Bellermann LLP

(57) ABSTRACT

An advanced driver-assistance system (ADAS) comprises: a sensor; a behavior planner that performs multi-policy lane change assistance for a vehicle by evaluating multiple scenarios based on an output of the sensor using a cost-based architecture, the cost-based architecture including a Markov decision process (MDP) with a discounted horizon approach applied to pre-chosen open-loop optimistic policies that are time based, wherein the behavior planner uses the MDP for choosing among the pre-chosen open-loop optimistic policies based on respective costs associated with the pre-chosen open-loop optimistic policies, the costs determined by performing a rollout for at least one gap in a fixed time horizon; a motion planner receiving an output of the behavior planner based on the MDP; and a controller receiving an output of the motion planner and determining vehicle dynamics of the vehicle for a next timestep.

10 Claims, 6 Drawing Sheets

(52) U.S. Cl.
CPC . *B60W 2050/0012* (2013.01); *B60W 2552/10*
(2020.02); *B60W 2554/4041* (2020.02); *B60W*
*2554/4046* (2020.02); *B60W 2554/4049*
(2020.02)

(58) Field of Classification Search
CPC . B60W 2554/4041; B60W 2554/4046; B60W
2554/4049; B60W 2720/103; B60W
60/0011; B60W 30/10; B60W 30/095;
B60W 40/02; B60W 2420/403; B60W
2420/408; G08G 1/167; G05D 1/00;
G01C 21/00
See application file for complete search history.

(56) References Cited

U.S. PATENT DOCUMENTS

| | | | | |
|---|---|---|---|---|
| 12,420,844 | B2 * | 9/2025 | Chen | G06N 3/047 |
| 2015/0191170 | A1 * | 7/2015 | Johansson | B60K 31/00 |
| | | | | 701/94 |
| 2017/0242435 | A1 * | 8/2017 | Nilsson | G08G 1/167 |
| 2019/0391580 | A1 * | 12/2019 | Di Cairano | G08G 1/165 |
| 2021/0074162 | A1 * | 3/2021 | Jafari Tafti | B60W 30/095 |
| 2021/0253128 | A1 * | 8/2021 | Nister | G05D 1/646 |
| 2021/0341941 | A1 * | 11/2021 | Karaman | G06N 20/00 |
| 2021/0370980 | A1 * | 12/2021 | Ramamoorthy | G06N 20/00 |
| 2022/0138568 | A1 * | 5/2022 | Smolyanskiy | G06N 3/044 |
| | | | | 706/21 |
| 2022/0146997 | A1 * | 5/2022 | Stepanova | G06N 20/00 |
| 2022/0176554 | A1 * | 6/2022 | Thai | G05B 13/027 |
| 2022/0185289 | A1 * | 6/2022 | Arora | B62D 15/0255 |
| 2022/0187841 | A1 * | 6/2022 | Ebrahimi Afrouzi | |
| | | | | G05D 1/0242 |
| 2022/0258764 | A1 * | 8/2022 | Fairley | G06N 20/00 |
| 2022/0269279 | A1 * | 8/2022 | Redford | G06N 3/006 |
| 2023/0166764 | A1 * | 6/2023 | Johnson | G06Q 10/047 |
| | | | | 701/23 |
| 2023/0174084 | A1 * | 6/2023 | Olson | G06F 16/2455 |
| | | | | 701/23 |
| 2023/0256991 | A1 * | 8/2023 | Johnson | B60W 30/18159 |
| 2023/0259830 | A1 * | 8/2023 | Subramanian | G06F 18/217 |
| | | | | 706/12 |
| 2023/0322208 | A1 * | 10/2023 | Rojas | B60W 50/085 |
| | | | | 701/41 |
| 2024/0010196 | A1 * | 1/2024 | Leung | B60W 60/0015 |
| 2024/0010232 | A1 * | 1/2024 | Karkus | G06N 3/045 |
| 2024/0013124 | A1 * | 1/2024 | Vandike | G06Q 10/067 |
| 2024/0017743 | A1 * | 1/2024 | Farid | B60W 60/00274 |
| 2024/0198518 | A1 * | 6/2024 | Bottero | G06N 3/092 |
| 2024/0239374 | A1 * | 7/2024 | Nister | B60W 60/0027 |
| 2024/0265263 | A1 * | 8/2024 | Moskovitz | G06N 3/091 |
| 2024/0326792 | A1 * | 10/2024 | Puphal | B60W 60/0027 |
| 2025/0206354 | A1 * | 6/2025 | Weast | B60W 30/095 |
| 2025/0233800 | A1 * | 7/2025 | Alabbasi | H04L 1/0026 |

OTHER PUBLICATIONS

Cunningham, Alexander G., et al. "MPDM: Multipolicy decision-making in dynamic, uncertain environments for autonomous driving." 2015 IEEE International Conference on Robotics and Automation (ICRA). IEEE, 2015. (Year: 2015).*

Hubmann, Constantin, Michael Aeberhard, and Christoph Stiller. "A generic driving strategy for urban environments." 2016 IEEE 19th International Conference on Intelligent Transportation Systems (ITSC). IEEE, 2016. (Year: 2016).*

W. Ding, L. Zhang, J. Chen and S. Shen, "EPSILON: An Efficient Planning System for Automated Vehicles in Highly Interactive Environments," in IEEE Transactions on Robotics, vol. 38, No. 2, pp. 1118-1138, Apr. 2022, doi: 10.1109/TRO.2021.3104254. (Year: 2022).*

Galceran, E., Cunningham, A.G., Eustice, R.M. et al. Multipolicy decision-making for autonomous driving via changepoint-based behavior prediction: Theory and experiment. Auton Robot 41, 1367-1382 (2017). (Year: 2017).*

International Search Report and Written Opinion for PCT Application No. PCT/US2023/074895, mailed on Feb. 21, 2024, 12 pages.

International Search Report and Written Opinion for PCT Application No. PCT/US2023/074895, mailed on Jan. 3, 2024, 12 pages.

Bubeck, Sebastien , et al., "Open Loop Optimistic Planning", http://sbubeck.com/COLT10_BM.pdf; Jan. 1, 2010, 15 pages.

Ding, Wenchao , et al., "Epsilon: An Efficient Planning System for Automated Vehicles in Highly Interactive Environments", arXiv:2108.07993v1; Aug. 18, 2021, 20 pages.

C. Hubmann et al.: "A Belief State Planner for Interactive Merge Maneuvers in Congested Traffic," 2018 21st International Conference on Intelligent Transportation Systems (ITSC), IEEE, Nov. 2018, pp. 1617-1624.

* cited by examiner

MULTI-POLICY LANE CHANGE ASSISTANCE FOR VEHICLE

CROSS-REFERENCE TO RELATED APPLICATION

This application claims benefit, under 35 U.S.C. § 119, of U.S. Provisional Patent Application No. 63/379,085, filed on Oct. 11, 2022, entitled "MULTI-POLICY LANE CHANGE ASSISTANCE FOR VEHICLE", the disclosure of which is incorporated by reference herein in its entirety.

TECHNICAL FIELD

This document relates to multi-policy lane change assistance for a vehicle.

BACKGROUND

Some vehicles manufactured nowadays are equipped with one or more types of systems that can at least in part handle operations relating to the driving of the vehicle. Some such assistance involves automatically surveying surroundings of the vehicle and being able to take action regarding detected vehicles, pedestrians, or objects.

SUMMARY

In an aspect, an advanced driver-assistance system (ADAS) comprises: a sensor; a behavior planner that performs multi-policy lane change assistance for a vehicle by evaluating multiple scenarios based on an output of the sensor using a cost-based architecture, the cost-based architecture including a Markov decision process (MDP) with a discounted horizon approach applied to pre-chosen open-loop optimistic policies that are time based, wherein the behavior planner uses the MDP for choosing among the pre-chosen open-loop optimistic policies based on respective costs associated with the pre-chosen open-loop optimistic policies, the costs determined by performing a rollout for at least one gap in a fixed time horizon; a motion planner receiving an output of the behavior planner based on the MDP; and a controller receiving an output of the motion planner and determining vehicle dynamics of the vehicle for a next timestep.

Implementations can include any or all of the following features. The behavior planner: identifies multiple gaps in traffic for the multi-policy lane change assistance; performs a rollout for each of the gaps; and evaluates costs of each of the pre-chosen open-loop optimistic policies. The fixed time horizon is common to each of the multiple gaps. The behavior planner factors in a prediction regarding a lane in performing at least one of the rollouts. If a lane where an actor is located can only be predicted for a certain length of time, then a behavior of the actor is predicted in the rollout only up until the certain length of time. Applying the discounted horizon approach comprises prioritizing events closer to the vehicle. Each of the pre-chosen open-loop optimistic policies comprises a combination of actions for the vehicle, including a fixed trajectory represented by a velocity profile. The MDP comprises iterating for each of multiple gaps identified for the multi-policy lane change assistance. The MDP further comprises iterating for each of the pre-chosen open-loop optimistic policies for each of the gaps.

BRIEF DESCRIPTION OF DRAWINGS

Like reference symbols in the various drawings indicate like elements.

DETAILED DESCRIPTION

Figure 1:
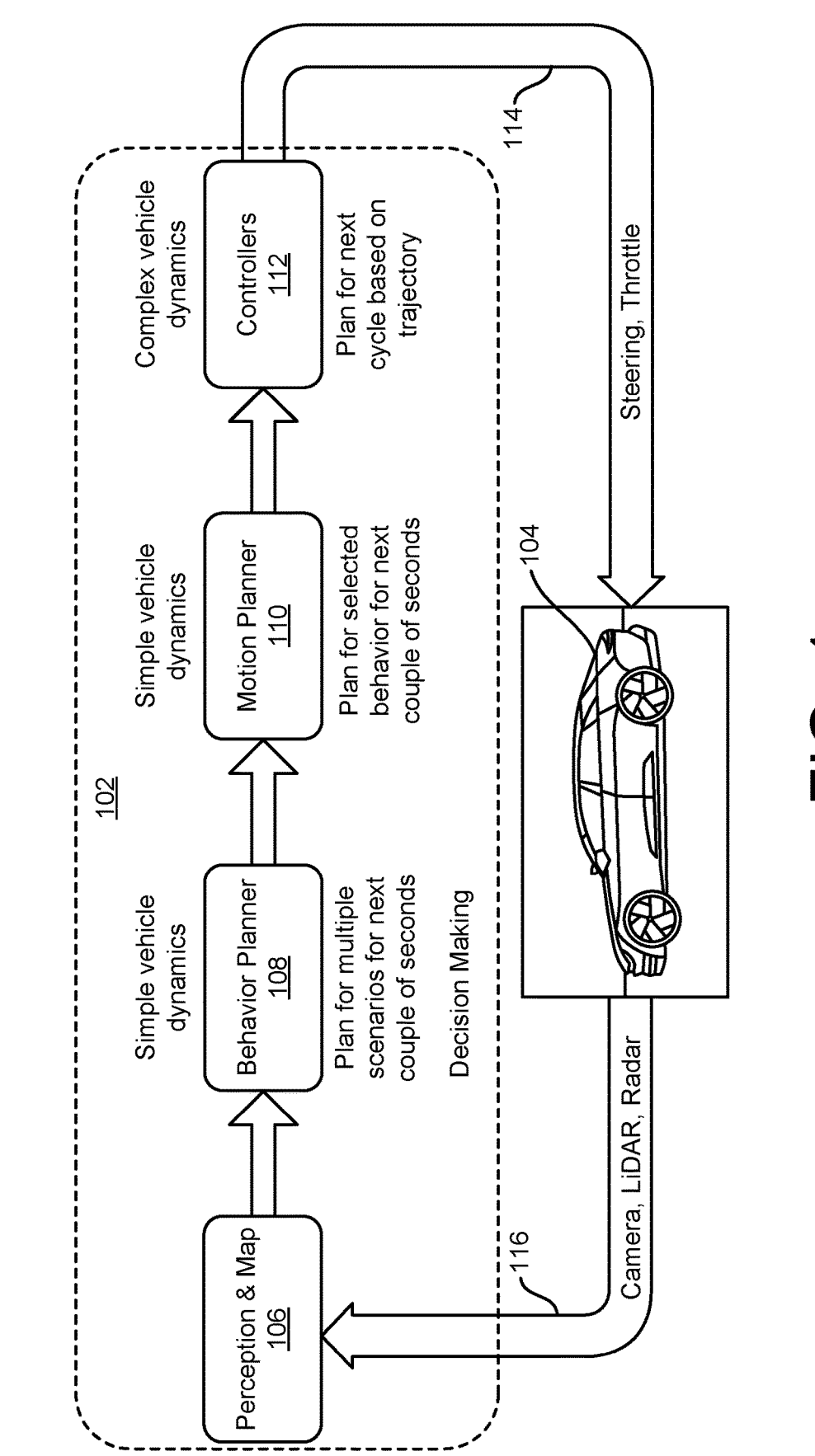
FIG. 1 shows an example of an architecture for an advanced driving-assistance systems (ADAS) that can provide multi-policy lane change assistance.

This document describes examples of systems and techniques providing multi-policy lane change assistance for a vehicle. In some implementations, an ADAS uses a Markov decision process (MDP) that has a cost-based architecture to support evaluation and use of multiple policies for controlling the vehicle. A decision-making process can be implemented in a single framework where a cost optimization algorithm can be used for determining, given constraints, a lane change to execute. When going through the MDP, a discounted horizon can be applied on cost evaluations to take less cost from the future and more cost from closer to the present. A cost-based implementation can provide a streamlined approach to incorporate unforeseen conditions by assigning a cost factor and integrating into the ADAS architecture. A discounted horizon approach can be applied in a cost-based framework. A set of profiles (e.g., velocity profiles) can be used to enable a robust and proactive variable-speed based lane change maneuver. As such, decision making can primarily be supported by the cost-based framework. Costs in this regard can be evaluated based on trajectory predictions (rollouts) for the ADAS vehicle (the "ego vehicle") and one or more actors in the vicinity of the ego vehicle (e.g., other vehicles). Cost evaluation can be carried out for multiple abstract driving profiles, or policies. As such, the present disclosure relates to an ADAS making a suggestion for, and/or assisting with executing, a lane change for an ego vehicle.

In some implementations, a given scenario around the ego vehicle can be represented as multiple gaps, each gap existing between two or more actors. A rollout can be carried out for each actor and the ego vehicle. For example, this can involve using constant acceleration profiles for actors and a double trapezoidal acceleration profile for the ego vehicle. The double trapezoidal acceleration profile can generate a minimum-time acceleration profile with one or more constraints (e.g., a constraint on the rate of change in acceleration, or jerk). Cost evaluation can be carried out for each gap and for each of multiple abstract profiles. A pair of one gap and one policy can be chosen from among the evaluated policy-gap pairs. As such, each gap will have an at least locally optimal policy that is generated based on the overall costs for each policy available for that gap. These approaches can be implemented to exploit the circumstance that the cost structure for respective policies with regard to a gap is a rather convex phenomenon.

In previous approaches for lane change assistance, other attempts have been used. These approaches have predominantly focused on heuristic decision making based on expert knowledge. For example, a simple heuristic such as an if/else rule has been applied to actor relative velocity or distance. This usually results in implementation of a rule-based architecture that is intractable when accounting for the numerous real-world conditions and situations. Some prior attempts have involved cost analysis but have sought to execute this in a trajectory planner of the ego vehicle. Others have proposed lane change approaches based on reinforcement learning or artificial intelligence (AI).

Each of such prior approaches is associated with disadvantages. A rule-based architecture can be difficult to scale with additional uncertainties, which can lead to a brittle implementation making discrete decisions and suffering from non-robust decision making under uncertainty. The architecture can be difficult to maintain and be prone to errors and complexity explosion. The resulting behavior of the ego vehicle can be robotic and not human-like. These approaches are also architecturally different from AI-based decision making systems. Approaches focusing on trajectory planning only, in turn, can be disadvantageous by not being scalable for multiple objects in the target lane, meaning that they do not support choosing between gaps for a lane change. Also, placing the entire heavy computational load on the motion planner can make dealing with uncertainties very challenging. AI-based approaches, finally, can require complex libraries and solvers (particularly since online decision making is involved). For Level 2 or 3 solutions according to the SAE International definition, seeking to incorporate AI may be computationally intractable in many scenarios.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an ADAS. In some implementations, an ADAS can perform assisted driving and/or autonomous driving. An ADAS can at least partially automate one or more dynamic driving tasks. An ADAS can operate based in part on the output of one or more sensors typically positioned on, under, or within the vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of an ADAS, not every ADAS is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a lane for a vehicle. As used herein, a lane is a path traveled by a vehicle currently or in the future; the path where the vehicle is currently located can be referred to as an ego lane. By contrast, a lane towards which the vehicle may be directed to travel is sometimes referred to as a target lane. A lane may be, but is not necessarily, defined by one or more markings on or adjacent the roadway. The distinction between one lane and another lane can be visually noticeable to a passenger, or can be solely defined by the ADAS, to name just two examples. A lane as used herein includes a straight roadway (e.g., free of turns) and a roadway making one or more turns. A lane as used herein can be part of a roadway that is restricted to one-way travel (e.g., a one-way street), or can be part of a roadway allowing two-way traffic. A lane as used herein can be part of a roadway that has multiple lanes. In the present subject matter, an ego lane and a target lane can be, but are not necessary, essentially parallel to each other. For example, one of the ego lane and the target lane can form a nonzero angle relative to the other.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); or an orientation sensor (e.g., for the vehicle or a component thereof).

FIG. 1 shows an example 100 of an architecture 102 for an ADAS that can provide multi-policy lane change assistance. The architecture 102 can be used with one or more other examples described elsewhere herein. The ADAS having the architecture 102 is implemented to control a vehicle 104. The architecture 102 includes a perception and map component 106, a behavior planner 108, a motion planner 110, and controllers 112 for the vehicle 104. Each of the perception and map component 106, behavior planner

108, or the motion planner 110 can be implemented using examples described below with reference to FIG. 6; for example, each of the perception and map component 106, behavior planner 108, or the motion planner 110 can be performed by one or more corresponding electronic control unit (ECU) of the vehicle 104.

The perception and map component 106 can perform perception processing and map analysis for the vehicle 104. The perception processing can involve object detection, sensor fusion, and/or object tracking regarding input signals from one or more sensors. The vehicle 104 can have a rich sensor suite, including, but not limited to, camera, LiDAR, and/or radar. The outputs of one or more sensors can be processed by the perception and map component 106. For example, this can provide the ADAS with information about the environment or scenario around the vehicle 104, such as actors, predictions, or lane geometries.

The behavior planner 108 receives information from the perception and map component 106 and can serve as a central unit for decision making in the ADAS. This can involve, but is not limited to, evaluating multiple scenarios and trying to find an optimal behavior for the vehicle 104. As such, the operation of the behavior planner 108 involves relatively simple vehicle dynamics, such as planning for multiple scenarios over a next few seconds (or a longer or shorter time). The present subject matter can in part involve applying the behavior planner 108 as a resource in assisting the driver with executing a lane change and/or making a suggestion for a lane change. One advantage of approaches focusing on the behavior planner 108 can be that the motion planner 110 is used only for a selected behavior that has been determined to be superior (e.g., optimal) to other possibilities.

The output of the behavior planner 108 is provided to the motion planner 110 which likewise operates with regard to relatively simple vehicle dynamics. One difference, however, is that the motion planner 110 plans only the selected behavior over the next few seconds (or a longer or shorter time). For example, the motion planner 110 can solve a boundary value problem to generate a minimum time velocity profile. This can involve solving equations to find start and end values such as position, velocity, and/or acceleration. That is, the motion planner 110 can determine how to execute the decision made by the behavior planner 108. In some implementations, the behavior planner 108 can operate at a significantly lower frequency (e.g., at a substantially lesser level of detail) than the motion planner 110.

The controllers 112 receive output of the motion planner 110 (e.g., a definition of a trajectory) and determine the complex vehicle dynamics for the vehicle 104 in executing a next timestep. For example, this involves planning for a next cycle based on the determined trajectory. The controllers 112 can then apply control actions to one or more actuators of the vehicle 104, as schematically illustrated by an arrow 114, to regulate steering or throttle, to name just two examples. One or more sensors of the vehicle 104 can generate output that is provided to the perception and map component 106, as schematically illustrated by an arrow 116.

In terms of a brief overview, the present disclosure can provide a cost-based architecture that is focused on having multiple velocity profiles (policies) for the ego vehicle and can perform real-time optimization to choose one of the policies. This can provide a cohesive and low-fidelity trajectory simulation model for the ego vehicle to ensure a comfortable driving profile choice. Coherence with the trajectory planner profiles can be maintained while keeping computation costs low. Using cost-based strategies allows the ADAS to account for moderate stochasticity in perception and actor prediction (e.g., due to the inherently noisy output of sensors). The architecture can be modeled as a MDP together with a discounted horizon approach so that the decisions prioritize events near the ego vehicle. The policies used can be open loop (time based) optimistic policies. These policies contrast with state feedback-based policies of other approaches, such as Monte Carlo tree search, which are significantly more complicated to implement. In the present subject matter, a pre-chosen set of open loop policies can be used together with a receding horizon planning approach to provide a low computation budget solution architected on the fundamentals of the MDP. Policy optimization can be performed. In some implementations, a unimodality of the lane change problem can be exploited to optimize the policies further from the pre-chosen discrete set. For example, this can create a more optimal policy for guiding the motion planner.

The behavior planner 108 uses a MDP for choosing among policies for a lane change based on evaluating the costs associated with each policy. The policy will be applied for controlling the ego vehicle to enter one of possibly multiple gaps in traffic in the target lane. The MDP does not need to know the past information about states that the ego vehicle has been in. Rather, the MDP evaluates future scenarios by calculating their respective costs as a basis for the choice. Moderate stochasticity can be addressed by the discounted horizon approach, in which events closest to the ego vehicle in time are more important in the cost calculation than events further away in time. The cost can be additive in the calculation, and the consolidated costs can be heavily skewed toward the beginning of the proposed trajectory, because future costs have less weight.

The policies that the behavior planner 108 evaluates and chooses among are open loop policies that belong to a prechosen set. The open loop policies are time based but are not state based and therefore do not depend on feedback about the state of the ego vehicle. This avoids having a complex state feedback loop to the behavior planner 108 and can keep computation costs relatively low. Each policy can contain a combination of possible actions that the ego vehicle can do starting at a present time. These actions can include, but are not limited to, speeding up; slowing down; accelerating to reach a certain speed; decelerating to reach a certain speed; increasing speed to a certain level, then holding a constant speed, then decreasing speed to another certain level, then holding a different constant speed, to name a few examples. As such, each of the policies can be said to include a fixed trajectory represented by a velocity profile. The optimization that is performed in evaluating the policies and choosing among them is an online optimization that does not require or depend on any previous understanding of the states of the ego vehicle by exploiting the convexity of the problem of a lane change in traffic.

Figure 2:
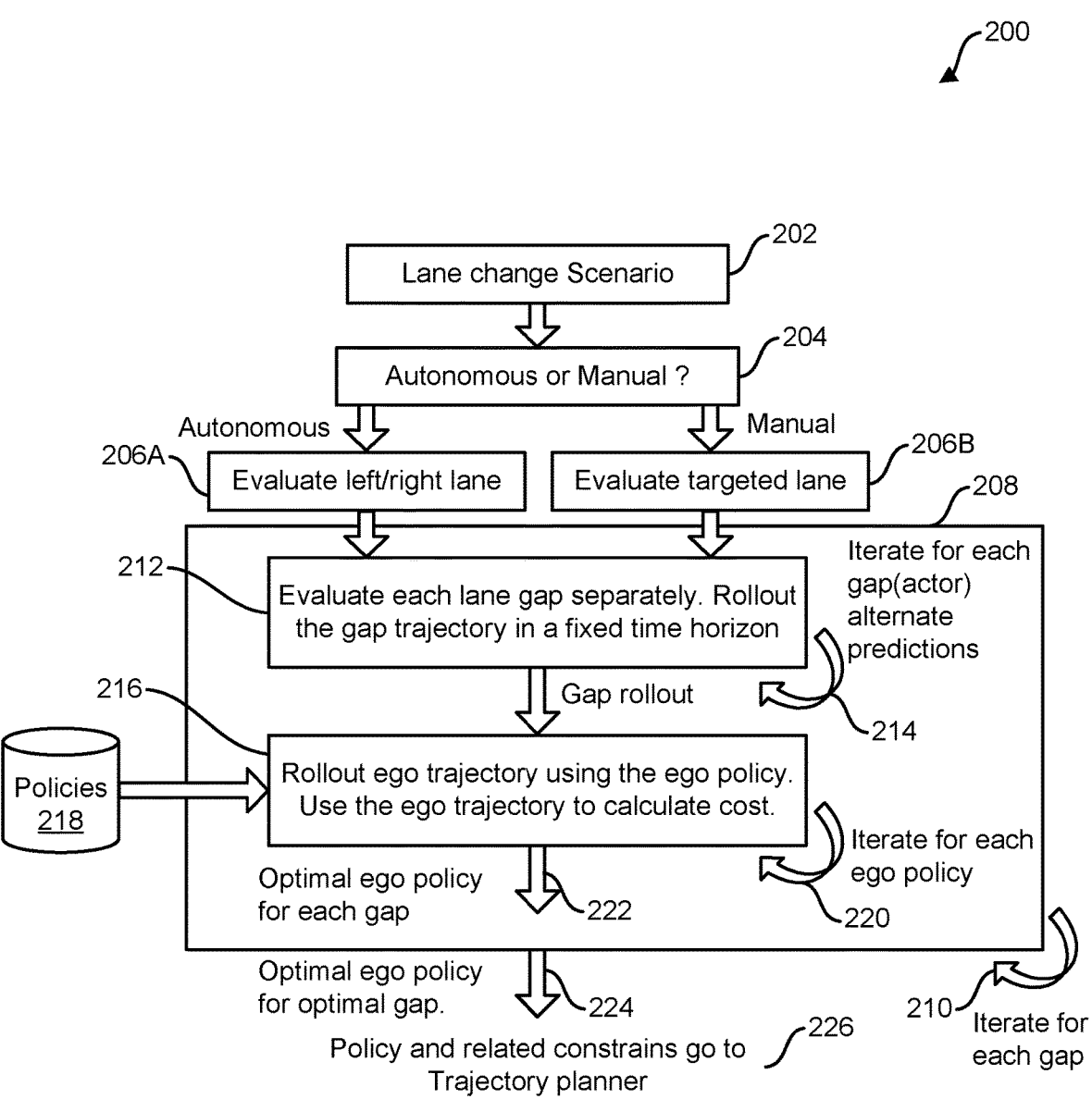
FIG. 2 shows an example of a flow for providing multi-policy lane change assistance.

FIG. 2 shows an example of a flow 200 for providing multi-policy lane change assistance. The flow 200 can be used with one or more other examples described elsewhere herein. For example, the flow 200 can be performed by the behavior planner 108 in FIG. 1.

At an operation 202, the flow 200 enters into a lane change scenario. In some implementations, the flow 200 can have one or more other possible branches (not shown) that the behavior planner 108 can perform. For example, the flow 200 can enter the operation 202 in an autonomous way (e.g., when as ADAS has decided on, or contemplates, making a lane change) or in a manual way (e.g., when a human driver of the ego vehicle makes a lane-change input, such by activating a turn signal). Accordingly, an operation 204 can direct the flow 200 into either an autonomous branch or a manual branch. In the autonomous branch, an operation 206A can initiate evaluation of all lanes that are available for the ADAS to change into (e.g., the lanes to the left and to the right of the ego vehicle). In the manual branch, an operation 206B can initiate evaluation of the lane that the human driver has targeted with the lane-change input.

Evaluation of a lane takes place through multiple operations here collectively represented as operations 208. The operations 208 can be performed as part of evaluating all available lanes (e.g., after the operation 206A) or as part of evaluating the targeted lane (e.g., after the operation 206B). An arrow 210 indicates that the operations 208 will be iterated for each gap detected in the lane being evaluated. Zero or more gaps may have been detected in the lane, so that there can be n number of gaps in the lane, with n=0, 1, 2, . . . . In operations 212, each lane gap will be evaluated separately, and a rollout for the detected gap will be performed independently in a fixed time horizon to predict how the gap will develop in the next amount of time (e.g., a number of seconds). An arrow 214 indicates that the operations 212 will be iterated for each gap (actor) alternate predictions. Illustrative examples will now be discussed.

Figure 3C:
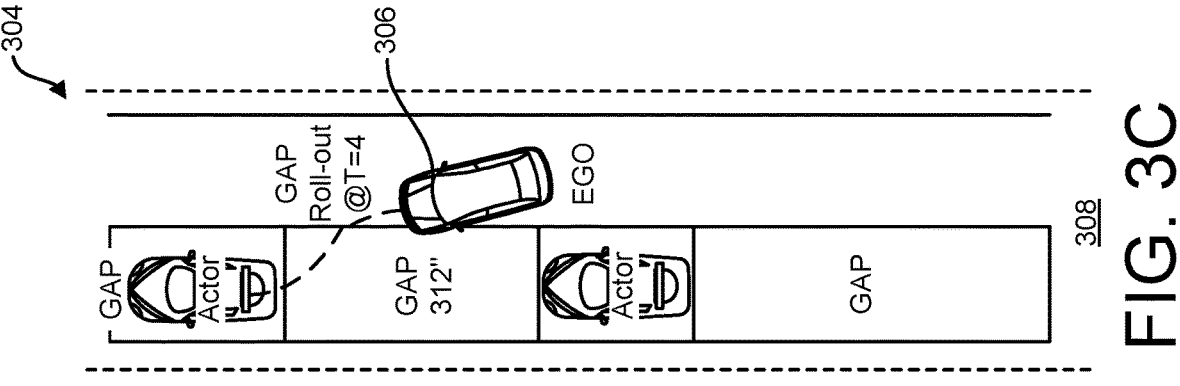
FIGS. 3A-3C show examples of a gap rollout for multi-policy lane change assistance.
Figure 3B:
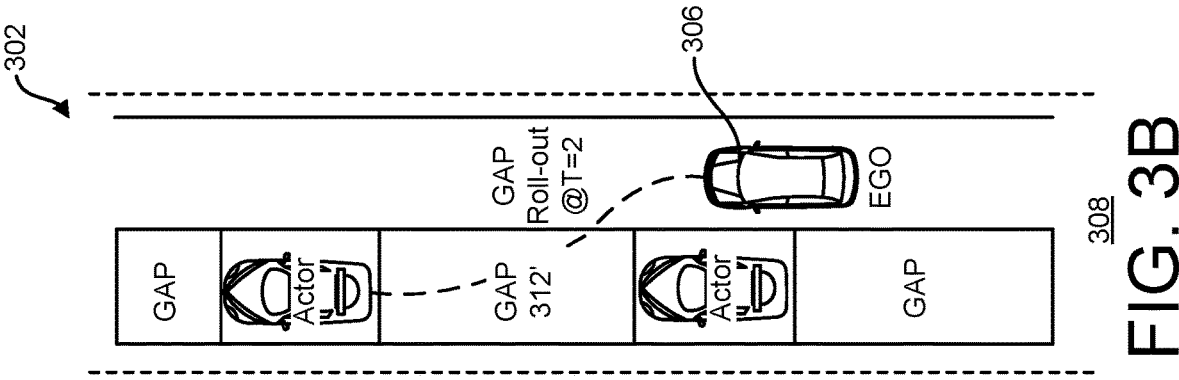
Figure 3A:
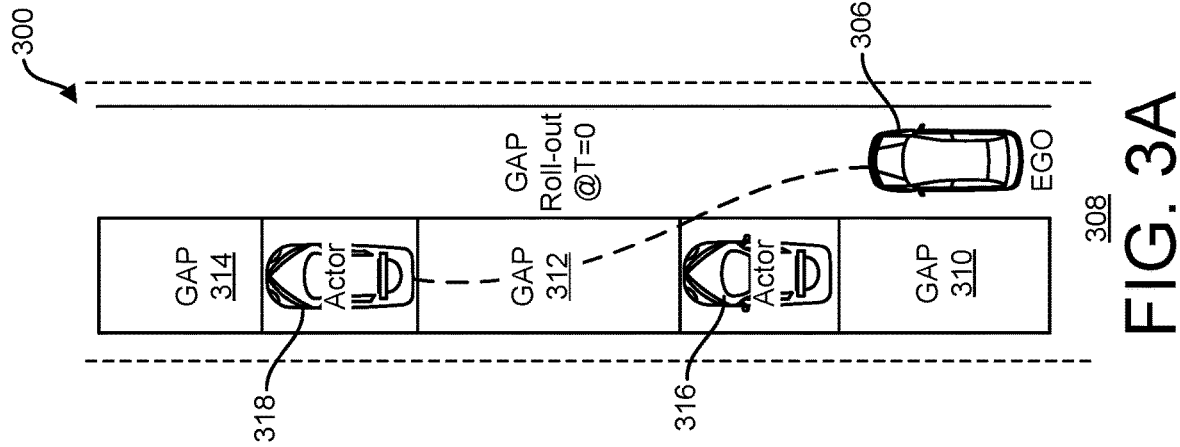
Figures 4A, 4B, 4C, 4D:
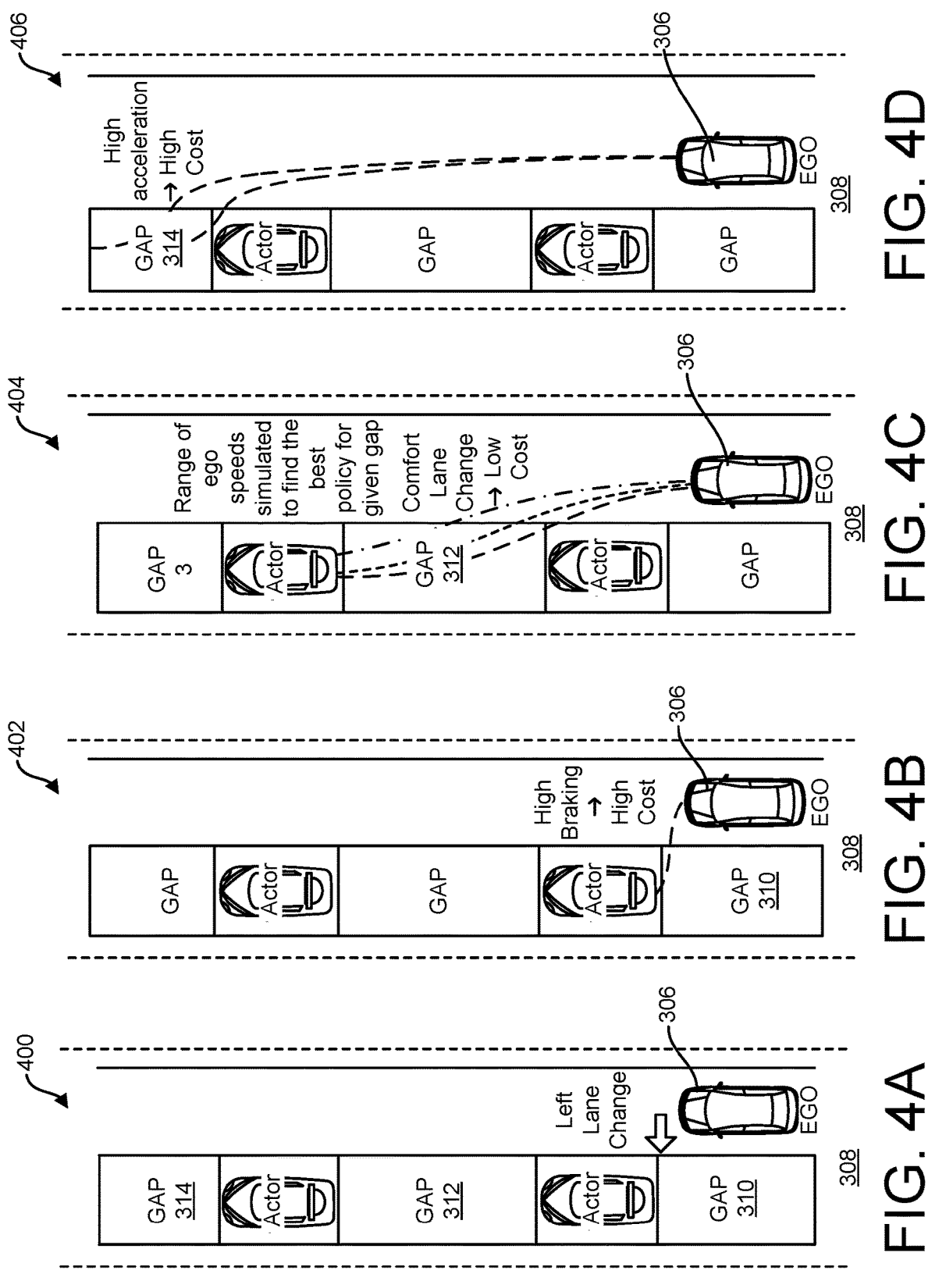
FIGS. 4A-4D show examples of evaluating respective costs of open-loop policies regarding gap rollouts.

FIGS. 3A-3C show examples 300, 302, and 304 of a gap rollout for multi-policy lane change assistance. The examples 300, 302, and 304 can be used with one or more other examples described elsewhere herein. Each of the examples 300, 302, and 304 involves an ego vehicle 306 that is traveling on a roadway 308. The ego vehicle 306 is currently in the right lane of the roadway 308 and the lane change being evaluated is for the ego vehicle 306 to move into the left lane of the roadway 308. In this example, the roadway 308 may be a one-way road having two or more lanes where traffic flows only in one direction.

In the example 300, the ADAS of the ego vehicle 306 has detected three gaps in the left lane: gap 310, gap 312, and 314, respectively. Each of the gaps 310-314 currently has particular dimensions, as defined by e.g. other actors on the roadway 308, such as other vehicles. Here, an actor 316 and an actor 318 are shown. The example 300 represents the situation as it exists at a time T=0. A rollout can be performed for each of the gaps 310-314 to predict how that gap will develop in the future, depending on the behavior of the actors 316-318. The examples 300-302 illustrate a possible rollout of the gap 312, whereas corresponding rollouts that are performed for the gaps 310 and 314 are not specifically discussed here.

The example 302 shows the prediction in the rollout of how the situation might exist at a future time, T=2. Here, the gap 312 is predicted to have developed into a gap 312'. For example, the gap 312' may have a different length than the gap 312. The example 304 shows the prediction in the rollout of how the situation might exist at a future time, T=4. Here, the gap 312' is predicted to have developed into a gap 312". For example, the gap 312" may have a different length than the gaps 312' and 312. The rollout for each gap can include a number of predictions, and the examples 300-304 need not be the only predictions that are made for the gap 312 in the time interval 0≤T≤4. The rollout is a behavior planning engineering simulation, and not a trajectory level approximation. As such, the behavior planner 108 does not figure out the trajectory for the ego vehicle 306 to follow. The rollout can include the same amount of simulation (e.g., a common fixed time horizon with the same temporal length and level of granularity) for each of the gaps 314-318, or different amounts of simulation can be performed. As indicated by the presence of the actors 316 and 318, the rollout involves an actor prediction, and the lanes of the roadway 308 can also factor into the rollout. For example, if the lane where the actor is located can only be predicted for a certain length of time into the future, then the actor's behavior can not be predicted for a length of time greater than the time of the lane. The prediction of the actor can assume that the simulation of the actor is static in nature and does not change in response to anything the ego vehicle may do or not do. Referring again also to the operation 212 in FIG. 2, each of the gaps 310-314 in the lane of the roadway 308 will be evaluated, and this can involve performing a rollout of the gap trajectory in a fixed time horizon.

In operations 216, a rollout of the trajectory of the ego vehicle will be performed using respective ones of policies 218. The policies 218 are open loop time based optimistic policies representing different behaviors according to which the ego vehicle could be controlled. There can be m number of the policies 218, with m=2, 3, 4 . . . . Briefly, and in the context of the examples 300-304 above, each of the policies 218 can define a possible way that the ego vehicle could maneuver from its current location into one of the gaps 310-314. For each of the rollouts of the ego trajectory with regard to any of the gaps, a corresponding cost associated with that policy and that gap will be calculated. An arrow 220 indicates that the operations 216 will be iterated for each ego-policy. That is, one of the policies 218 will be combined with one of the identified gaps and the cost associated with that pair will be determined, for all possible such pairs. Examples of the cost include, but are not limited to, a risk of collision between the ego vehicle and something else; a comfort of the driver or passenger of the ego vehicle during the lane change; or the effect on the state of charge (SOC) of the battery system (in cases where the ego vehicle is an electric vehicle). Illustrative examples will now be discussed.

FIGS. 4A-4D show examples 400, 402, 404, and 406 of evaluating respective costs of open-loop policies regarding gap rollouts. The examples 400, 402, 404, or 406 can be used with one or more other examples described elsewhere herein. Each of the examples 400, 402, 404, or 406 involves the ego vehicle 306 traveling on the roadway 308, with the gaps 310-314 having been identified among the actors 316-318.

All of the policies 218 can be evaluated for each lane change. Here, the examples 402-406 illustrate the evaluation of three different policies with regard to the situation shown in the example 400. In the example 402, a policy is applied that would maneuver the ego vehicle 306 into the gap 310. Because the gap 310 is essentially adjacent to the ego vehicle 306 in the example 400, applying this policy involves relatively high level of braking of the ego vehicle 306 (possibly followed by a relatively high level of acceleration after having entered the target lane). Such braking can be associated with a high cost in the evaluation of the policy.

In the example 404, a policy is applied that would maneuver the ego vehicle 306 into the gap 312. Because the gap 310 is somewhat ahead of the ego vehicle 306 in the example 400, applying this policy involves a relatively comfortable lane change for the driver and passengers of the ego vehicle 306. Such a lane change can be associated with a low cost in the evaluation of the policy.

In the example 406, a policy is applied that would maneuver the ego vehicle 306 into the gap 314. Because the gap 310 is significantly ahead of the ego vehicle 306 in the example 400, applying this policy involves relatively high level of acceleration of the ego vehicle 306 (possibly followed by a relatively high level of deceleration after having entered the target lane). Such acceleration/deceleration can be associated with a high cost in the evaluation of the policy.

In the flow 200 of FIG. 2, an arrow 222 following the operations 216 schematically illustrates that an optimal ego policy for each gap can be identified. In some implementations, this can be referred to as an online optimization because the MDP is applied in the cost-based framework where costs are discounted towards the time horizon. That is, the flow 200 can identify the one gap (e.g., optimal gap) of the identified gaps to be used for the lane change. An arrow 224 following the operations 208 schematically illustrates that an optimal ego policy for the optimal gap can be identified. In some implementations, the identification of a gap and a policy based on the cost evaluation can involve a golden section search. For example, the flow 200 may initially have two high-level policies that are simulated with (e.g., a highest and lowest policies). A multi-level (e.g., 10-level) optimization may be performed, and the flow 200 may be based on the assumption that the cost has a convex nature. Then, the flow 200 can progressively come up with finer policies in the iterations of an online optimization. In operation 226 of the flow 200, the behavior planner 108 can provide the selected policy and the related constraints to the motion planner 110.

Figure 5:
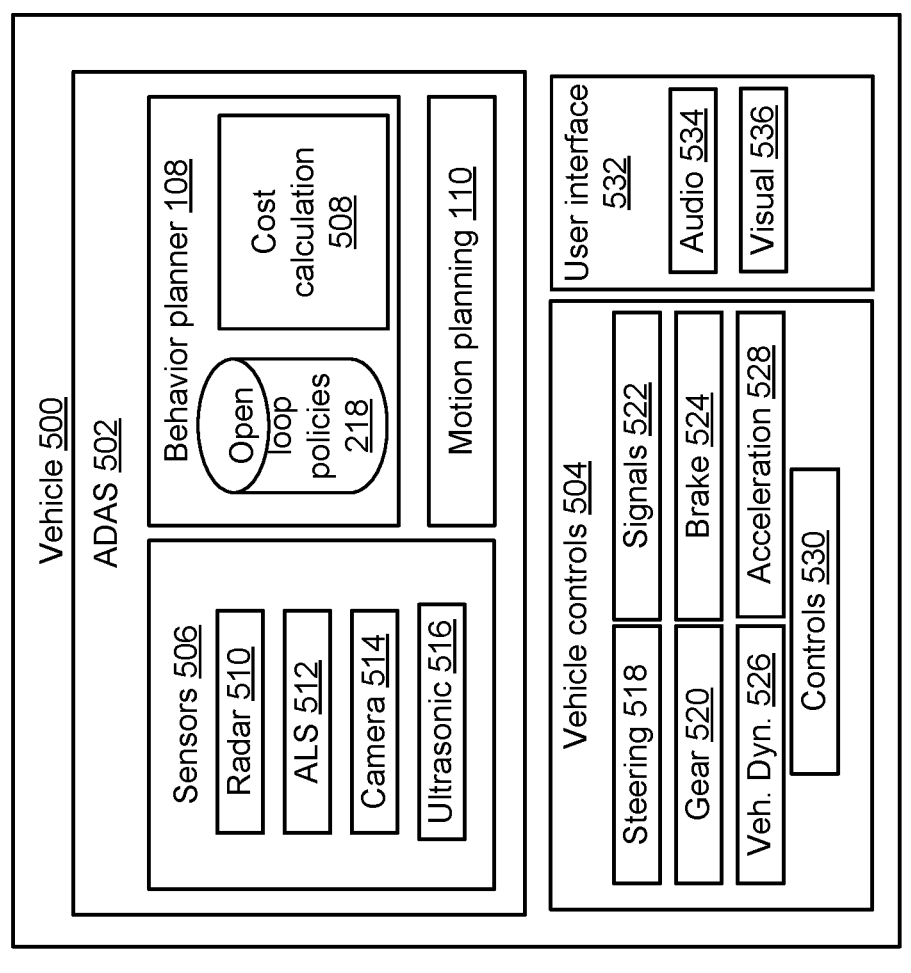
FIG. 5 shows an example of a vehicle.

FIG. 5 shows an example of a vehicle 500. The vehicle 500 can be used with one or more other examples described elsewhere herein. The vehicle 500 includes an ADAS 502 and vehicle controls 504. The ADAS 502 can be implemented using some or all components described with reference to FIG. 6 below. The ADAS 502 includes sensors 506, the behavior planner 108, and the motion planner 110. The behavior planner 108 includes the policies 218 and a cost calculation component 508. Other aspects that the vehicle 500 may include, including, but not limited to, other components of the vehicle 500 where the ADAS 502 may be implemented, are omitted here for simplicity.

The sensors 506 are here described as also including appropriate circuitry and/or executable programming for processing sensor output and performing a detection based on the processing. The sensors 506 can include a radar 510. In some implementations, the radar 510 can include any object detection system that is based at least in part on radio waves. For example, the radar 510 can be oriented in a forward direction relative to the vehicle and can be used for detecting at least a distance to one or more other objects (e.g., another vehicle). The radar 510 can detect the surroundings of the vehicle 500 by sensing the presence of an object in relation to the vehicle 500.

The sensors 506 can include an active light sensor 512 (ALS). In some implementations, the active light sensor 512 can include any object detection system that is based at least in part on laser light. For example, the active light sensor 512 can be oriented in any direction relative to the vehicle and can be used for detecting at least a distance to one or more other objects (e.g., a lane boundary). The active light sensor 512 can detect the surroundings of the vehicle 500 by sensing the presence of an object in relation to the vehicle 500. The active light sensor 512 can be a scanning LiDAR or a non-scanning LiDAR (e.g., a flash LiDAR), to name just two examples.

The sensors 506 can include a camera 514. In some implementations, the camera 514 can include any image sensor whose signal(s) the vehicle 500 takes into account. For example, the camera 514 can be oriented in any direction relative to the vehicle and can be used for detecting vehicles, lanes, lane markings, curbs, and/or road signage. The camera 514 can detect the surroundings of the vehicle 500 by visually registering a circumstance in relation to the vehicle 500.

The sensors 506 can include an ultrasonic sensor 516. In some implementations, the ultrasonic sensor 516 can include any transmitter, receiver, and/or transceiver used in detecting at least the proximity of an object based on ultrasound. For example, the ultrasonic sensor 516 can be positioned at or near an outer surface of the vehicle. The ultrasonic sensor 516 can detect the surroundings of the vehicle 500 by sensing the presence of an object in relation to the vehicle 500.

Any of the sensors 506 alone, or two or more of the sensors 506 collectively, can detect, whether or not the ADAS 502 is controlling motion of the vehicle 500, the surroundings of the vehicle 500. In some implementations, at least one of the sensors 506 can generate an output that is taken into account in providing an alert or other prompt to a driver, and/or in controlling motion of the vehicle 500. For example, the output of two or more sensors (e.g., the outputs of the radar 510, the active light sensor 512, and the camera 514) can be combined. In some implementations, one or more other types of sensors can additionally or instead be included in the sensors 506.

The behavior planner 108 and the motion planner 110 can plan for the ADAS 502 to perform one or more actions, or to not perform any action, in response to monitoring of the surroundings of the vehicle 500 and/or an input by the driver. The output of one or more of the sensors 506 can be taken into account. Particularly, the behavior planner 108 can provide lane change assistance, or lane change suggestion, by applying a MDP with a cost-based architecture that incorporates a discounted horizon approach. The cost calculation component 508 can take into account factors such as risk of collision, driver/passenger comfort, or SOC of the battery system, for each pair of a selected gap for the lane change and a selected policy for the ego vehicle. For example, the cost calculation component 508 can evaluate the respective costs associated with the lane changes in the examples 402-406.

The vehicle controls 504 can include a steering control 518. In some implementations, the ADAS 502 and/or another driver of the vehicle 500 controls the trajectory of the vehicle 500 by adjusting a steering angle of at least one wheel by way of manipulating the steering control 518. The steering control 518 can be configured for controlling the steering angle though a mechanical connection between the steering control 518 and the adjustable wheel, or can be part of a steer-by-wire system.

The vehicle controls 504 can include a gear control 520. In some implementations, the ADAS 502 and/or another driver of the vehicle 500 uses the gear control 520 to choose from among multiple operating modes of a vehicle (e.g., a Drive mode, a Neutral mode, or a Park mode). For example, the gear control 520 can be used to control an automatic transmission in the vehicle 500.

The vehicle controls 504 can include signal controls 522. In some implementations, the signal controls 522 can control one or more signals that the vehicle 500 can generate. For example, the signal controls 522 can control headlights, a turn signal and/or a horn of the vehicle 500.

The vehicle controls 504 can include brake controls 524. In some implementations, the brake controls 524 can control one or more types of braking systems designed to slow down the vehicle, stop the vehicle, and/or maintain the vehicle at a standstill when stopped. For example, the brake controls 524 can be actuated by the ADAS 502. As another example, the brake controls 524 can be actuated by the driver using a brake pedal.

The vehicle controls 504 can include a vehicle dynamic system 526. In some implementations, the vehicle dynamic system 526 can control one or more functions of the vehicle 500 in addition to, or in the absence of, or in lieu of, the driver's control. For example, when the vehicle comes to a stop on a hill, the vehicle dynamic system 526 can hold the vehicle at standstill if the driver does not activate the brake control 524 (e.g., step on the brake pedal).

The vehicle controls 504 can include an acceleration control 528. In some implementations, the acceleration control 528 can control one or more types of propulsion motor of the vehicle. For example, the acceleration control 528 can control the electric motor(s) and/or the internal-combustion motor(s) of the vehicle 500.

The vehicle controls can further include one or more additional controls, here collectively illustrated as controls 530. The controls 530 can provide for vehicle control of one or more functions or components. In some implementations, the controls 530 can regulate one or more sensors of the vehicle 500 (including, but not limited to, any or all of the sensors 506).

The vehicle 500 can include a user interface 532. The user interface 532 can include an audio interface 534 that can be used for generating a lane change suggestion. In some implementations, the audio interface 534 can include one or more speakers positioned in the passenger compartment. For example, the audio interface 534 can at least in part operate together with an infotainment system in the vehicle.

The user interface 532 can include a visual interface 536 that can be used for generating a lane change suggestion. In some implementations, the visual interface 536 can include at least one display device in the passenger compartment of the vehicle 500. For example, the visual interface 536 can include a touchscreen device and/or an instrument cluster display.

Figure 6:
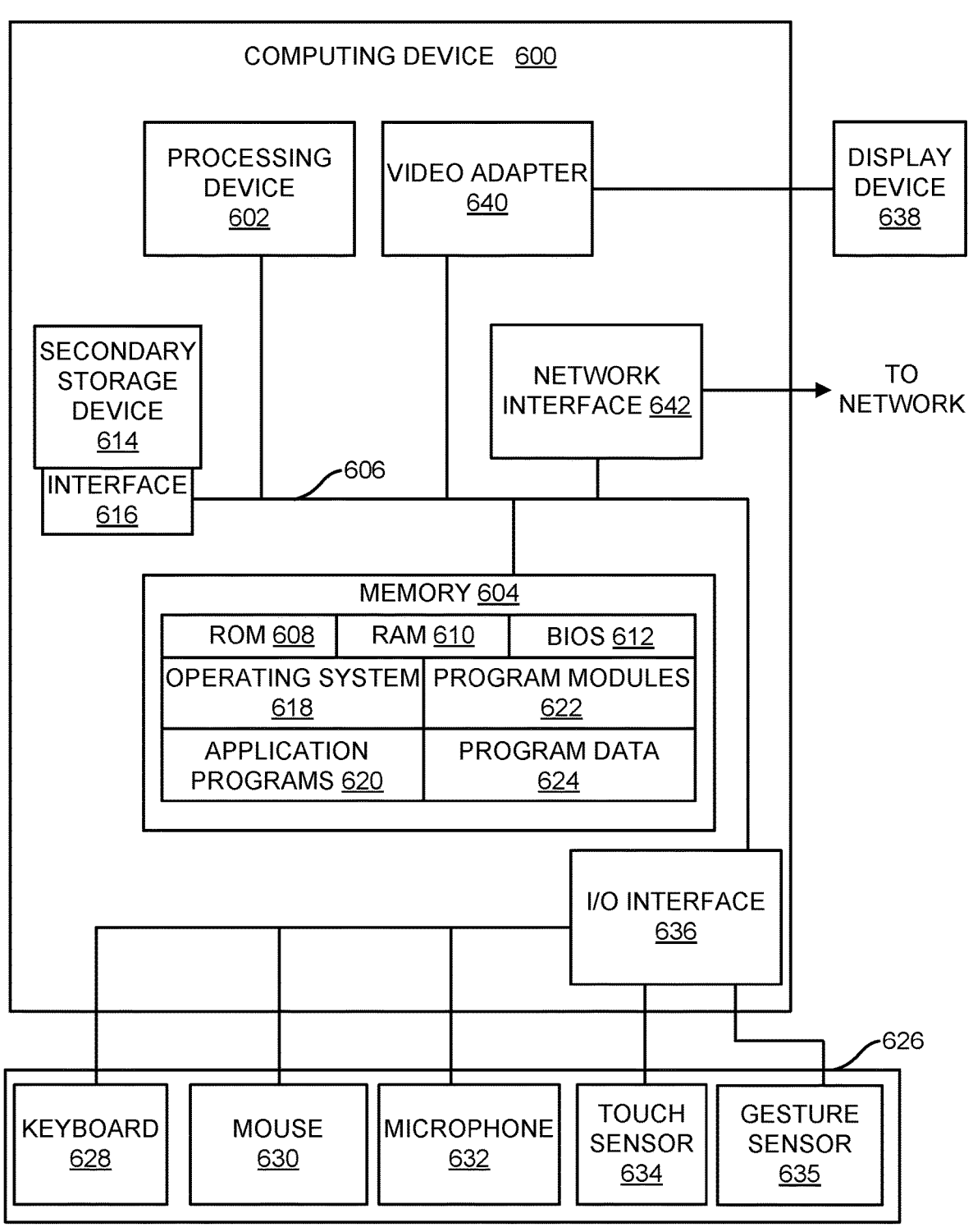
FIG. 6 illustrates an example architecture of a computing device that can be used to implement aspects of the present disclosure.

FIG. 6 illustrates an example architecture of a computing device 600 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 6 can be used to execute the operating system, application programs, and/or software modules (including the software engines) described herein.

The computing device 600 includes, in some embodiments, at least one processing device 602 (e.g., a processor), such as a central processing unit (CPU). A variety of processing devices are available from a variety of manufacturers, for example, Intel or Advanced Micro Devices. In this example, the computing device 600 also includes a system memory 604, and a system bus 606 that couples various system components including the system memory 604 to the processing device 602. The system bus 606 is one of any number of types of bus structures that can be used, including, but not limited to, a memory bus, or memory controller; a peripheral bus; and a local bus using any of a variety of bus architectures.

Examples of computing devices that can be implemented using the computing device 600 include a desktop computer, a laptop computer, a tablet computer, a mobile computing device (such as a smart phone, a touchpad mobile digital device, or other mobile devices), or other devices configured to process digital instructions.

The system memory 604 includes read only memory 608 and random access memory 610. A basic input/output system 612 containing the basic routines that act to transfer information within computing device 600, such as during start up, can be stored in the read only memory 608.

The computing device 600 also includes a secondary storage device 614 in some embodiments, such as a hard disk drive, for storing digital data. The secondary storage device 614 is connected to the system bus 606 by a secondary storage interface 616. The secondary storage device 614 and its associated computer readable media provide non-volatile and non-transitory storage of computer readable instructions (including application programs and program modules), data structures, and other data for the computing device 600.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 614 and/or system memory 604, including an operating system 618, one or more application programs 620, other program modules 622 (such as the software engines described herein), and program data 624. The computing device 600 can utilize any suitable operating system. In some embodiments, a user provides inputs to the computing device 600 through one or more input devices 626. Examples of input devices 626 include a keyboard 628, mouse 630, microphone 632 (e.g., for voice and/or other audio input), touch sensor 634 (such as a touchpad or touch sensitive display), and gesture sensor 635 (e.g., for gestural input). In some implementations, the input device(s) 626 provide detection based on presence, proximity, and/or motion. Other embodiments include other input devices 626. The input devices can be connected to the processing device 602 through an input/output interface 636 that is coupled to the system bus 606. These input devices 626 can be connected by any number of input/output interfaces, such as a parallel port, serial port, game port, or a universal serial bus. Wireless communication between input devices 626 and the input/output interface 636 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 638, such as a monitor, liquid crystal display device, light-emitting diode display device, projector, or touch sensitive display device, is also connected to the system bus 606 via an interface, such as a video adapter 640. In addition to the display device 638, the computing device 600 can include various other peripheral devices (not shown), such as speakers or a printer.

The computing device 600 can be connected to one or more networks through a network interface 642. The network interface 642 can provide for wired and/or wireless communication. In some implementations, the network interface 642 can include one or more antennas for transmitting and/or receiving wireless signals. When used in a local area networking environment or a wide area networking environment (such as the Internet), the network interface 642 can include an Ethernet interface. Other possible embodiments use other communication devices. For example, some embodiments of the computing device 600 include a modem for communicating across the network.

The computing device 600 can include at least some form of computer readable media. Computer readable media includes any available media that can be accessed by the computing device 600. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 600.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 600 can be characterized as an ADAS computer. For example, the computing device 600 can include one or more components sometimes used for processing tasks that occur in the field of artificial intelligence (AI). The computing device 600 then includes sufficient proceeding power and necessary support architecture for the demands of ADAS or AI in general. For example, the processing device 602 can include a multicore architecture. As another example, the computing device 600 can include one or more co-processors in addition to, or as part of, the processing device 602. In some implementations, at least one hardware accelerator can be coupled to the system bus 606. For example, a graphics processing unit can be used. In some implementations, the computing device 600 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An advanced driver-assistance system (ADAS) comprising:

a sensor;

a behavior planner that performs multi-policy lane change assistance for a vehicle by identifying multiple gaps for the multi-policy lane change assistance and evaluating multiple scenarios based on an output of the sensor using a cost-based architecture, the cost-based architecture including a Markov decision process (MDP) with a discounted horizon approach applied to pre-chosen open-loop optimistic policies that are time based, wherein the behavior planner uses the MDP for choosing among the pre-chosen open-loop optimistic policies by evaluating respective costs of each of the pre-chosen open-loop optimistic policies, the costs determined by performing a rollout for each of the gaps in a fixed time horizon such that if a lane where an actor is located can only be predicted for a certain length of time, then a behavior of the actor is predicted in the rollout only up until the certain length of time;

a motion planner receiving an output of the behavior planner based on the MDP; and a controller receiving an output of the motion planner, determining vehicle dynamics of the vehicle for a next timestep, and controlling motion of the vehicle according to the vehicle dynamics of the vehicle for the next timestep.

2. The ADAS of claim 1, where the fixed time horizon is common to each of the gaps.

3. The ADAS of claim 1, wherein applying the discounted horizon approach comprises prioritizing events closer to the vehicle in time over events further away from the vehicle in time.

4. The ADAS of claim 1, wherein each of the pre-chosen open-loop optimistic policies comprises a combination of actions for the vehicle, including a fixed trajectory represented by a velocity profile.

5. The ADAS of claim 1, wherein the MDP comprises iterating for each of multiple gaps identified for the multi-policy lane change assistance.

6. The ADAS of claim 5, wherein the MDP further comprises iterating for each of the pre-chosen open-loop optimistic policies for each of the gaps.

7. A method comprising:

receiving a sensor output from a sensor of an advanced driver-assistance system (ADAS);

performing multi-policy lane change assistance for a vehicle including:

identifying, by a processor, multiple gaps for the multi-policy lane change assistance:

applying, by the processor, in a Markov decision process (MDP), a discounted horizon approach to pre-chosen open-loop optimistic policies that are time based; and evaluating, by the processor, multiple scenarios based on the sensor output using a cost-based architecture, including using the MDP for choosing among the pre-chosen open-loop optimistic policies by evaluating respective costs of each of the pre-chosen open-loop optimistic policies, the costs determined by performing a rollout for each of the gaps such that if a lane where an actor is located can only be predicted for a certain length of time;

generating, by the processor, a behavior planning output based on the MDP;

generating, by the processor, amotion planning output based on the behavior planning output;

determining, by the processor, vehicle dynamics of the vehicle for a next timestep based on the motion planning output; and controlling, by the processor, motion of the vehicle according to the vehicle dynamics of the vehicle for the next timestep.

8. The method of claim 7, wherein applying the discounted horizon approach comprises prioritizing events closer to the vehicle.

9. The method of claim 7, wherein the MDP comprises iterating for each of multiple gaps identified for the multi-policy lane change assistance.

10. The method of claim 7, wherein the MDP comprises iterating for each of the pre-chosen open-loop optimistic policies for each of the gaps.

\* \* \* \* \*